UNITED STATES PATENT OFFICE.

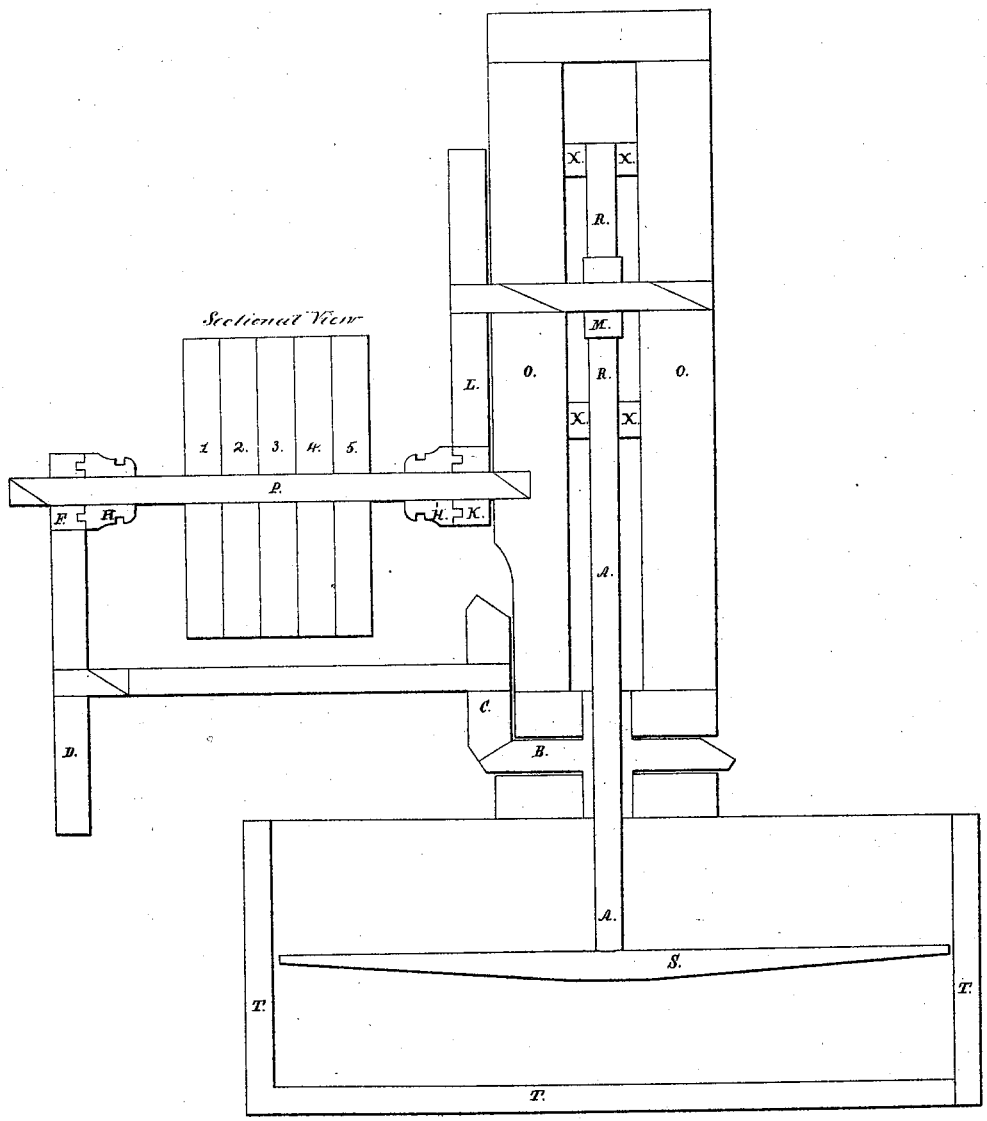

LARNARD M. WRIGHT, OF FORT EDWARD, NEW YORK.

IMPROVED APPARATUS FOR WASHING PAPER-PULP.

Specification forming part of Letters Patent No. 54,993, dated May 22, 1866.

*To all whom it may concern:*

Be it known that I, LARNARD M. WRIGHT, of Fort Edward, in the county of Washington and State of New York, have invented a new and Improved Apparatus for the Washing of Paper-Stock preparatory to the use thereof in the Manufacture of Paper; and I do hereby declare that the following is a full and exact description thereof, reference being had to the accompanying drawings, and to the letters of reference marked thereon.

The nature of my improvement consists in providing an adjustable beater or revolving arm, which may be raised or lowered at the pleasure of the operator, to which arm may be attached projecting fingers for the purpose of more effectually agitating the pulpy mass being washed.

To enable others skilled in the art to make and use my improvement and invention, I will proceed to describe the same in its construction and operation.

Figure 1 is a sectional view of the tub or vat in which the paper-stock is to be washed, and of the cover thereof and the frame-work thereupon, by means of which the beater or revolving arm is made adjustable, and of the wheel-pinion, shaft, and driving-pulley. Fig. 2 is a vertical view of the same.

In Fig. 1, E represents the circular tub or vat in which the paper-stock is to be washed, and in which the pulpy mass is placed for that purpose.

K K represents a beam or cover extending across the upper or top part of the tub or vat, upon which rests the structure for driving the said revolving arms C C.

B B represents a bevel-wheel with its hub *x x x x*.

A represents a square shaft or a round shaft with a feather passing through a square hole or a round hole in the bevel-wheel hub *x x x x*, and being fastened to the revolving arms C C. The upper end of the shaft A is attached or suspended to the adjustable cross-bar J.

O O O O is the frame supporting the crank F, the fixed pulley H, and the adjustable cross-bar J. The cross-bar J is guided by projections or tenons extending from each end of the same into corresponding grooves in the upright beams O O O O, and the revolving arms C C, the upright shaft A, and the cross-bar J are raised or lowered by means of a cord attached at one end to the shaft of the crank F, and passing thence over the fixed pulley H, attached at the other end thereof to the cross-bar J, as represented in Fig. 1. The arms C C are caused to revolve by means of the driving-pulley W, the horizontal shaft D, the pinion P, and the bevel-wheel B B, through the hub of which the square shaft A passes, as above described.

The advantage gained by the use of the adjustable beater or revolving arms C C is found in this: By commencing at the upper surface of the contents of the tub or vat and gradually depressing the arms of the beater into the pulpy mass of the stock being washed a much more thorough agitation is immediately obtained, at less expense of power, by gradually beating up the surface, which when sufficiently beaten and washed the arms are farther depressed into the stock, and thus continued until the whole mass is sufficiently beaten and washed for the purposes described. During this process of beating and washing clear water is admitted into the tub or vat through the bottom thereof in the usual way.

Having thus fully described my said invention and improvement, what I claim as such, and desire to secure by Letters Patent, is—

1. The adjustable arms C C, in combination with a shaft, A, fixed pulley H, and crank F, substantially as and for the purposes above described.

2. The application of an adjustable revolving beater or washer to a tub or vat containing stock to be beaten or washed, in the manner and for the purposes above described.

LARNARD M. WRIGHT.

Witnesses:
   A. C. HORSMAN,
   ASAHEL WING.